March 15, 1949.  F. J. RAYBOULD  2,464,416
HOSE END ASSEMBLY

Filed April 20, 1946  3 Sheets-Sheet 1

INVENTOR.
FRANK J. RAYBOULD
BY Richey & Watts
ATTORNEYS

March 15, 1949.    F. J. RAYBOULD    2,464,416
HOSE END ASSEMBLY
Filed April 20, 1946    3 Sheets-Sheet 3

INVENTOR.
FRANK J. RAYBOULD
BY Richey & Watts
ATTORNEYS

Patented Mar. 15, 1949

2,464,416

UNITED STATES PATENT OFFICE 2,464,416

HOSE END ASSEMBLY

Frank J. Raybould, Lakewood, Ohio, assignor to The Weatherhead Company, Cleveland, Ohio, a corporation of Ohio Application April 20, 1946, Serial No. 663,679

2 Claims. (Cl. 285—84)

This invention relates to fittings, more specifically to the type of fitting commonly called a detachable hose end. Devices of the type to which this invention relates are designed to be attached to the end of a hose of rubber or other flexible material and to firmly grip the hose so that when the fitting is assembled with its complementary part no leakage will occur at the fitting and around the hose even under high pressure and impulse loadings.

Although it is possible to produce a fitting which will be leak proof up to the bursting point of the hose under impulse or vibratory loads, such fittings have been relatively large and heavy because they have required a large area of sealing and gripping contact with the hose in order to produce the desirable results mentioned. Many of such fittings have been relatively long, the hose gripping part being several hose diameters in length. Those skilled in the art know that in modern aircraft installations hydraulics are playing a role of ever-increasing importance, the result being that the number of hydraulic fittings in hose end required to equip a modern airplane is very large. Consequently, in this field it is extremely desirable and even imperative that the fittings be as light and as compact as possible. Accordingly, it is an object of this invention to provide a fitting which is lighter and more compact than any found in the prior art but which, despite this reduction in size and weight, will produce a joint superior to any similar fittings found in the art. Although many attempts have been made to accomplish this result, none have done so with a fitting as light and compact as that disclosed in this invention. Briefly, I accomplish these desirable results, by providing a fitting which, when it is set up with ordinary tools, produces a dual hose clamping action so that the hose is both compressed from the outside and expanded from the inside in a novel manner as will be hereinafter explained.

Those skilled in the art are also aware of the fact that excessive deformation or biting of the hose seriously weakens it particularly under the high-pressure vibratory loads encountered in aircraft work. This is particularly true when the various synthetic hoses are used and, accordingly, it is an object of this invention to prevent serious or dangerous deformation of the hose and at the same time to obtain a superior sealing action.

Another difficulty commonly encountered when using hoses made of synthetic material is the tendency of such material to "cold flow." By cold flow is meant that property of the hose which causes it to flow away from a tightly clamped or gripped area into a relatively free or unclamped area, the result being that a fitting which originally provided an adequate seal will be found to permit leakage after a period of time. The fitting of my invention traps a certain amount of the hose in such a manner that cold flow cannot occur and the effectiveness of my joint is undiminished as time passes even when utilized with a hose of synthetic material.

It has been found that even the most carefully manufactured hose has variations in its inside and outside diameters and with many fittings found in the prior art such variations tend to produce an unsatisfactory connection. It is an object of my invention to satisfactorily seal hoses which vary a reasonable amount in their dimensions and, as will be seen in the following detailed description, I accomplish this by providing both an internal and an external clamping action.

A further object of this invention is to eliminate costly machining operations commonly found in hose ends of this type and also to eliminate the necessity for using special tools during the assembly operation.

The manner in which these and other objects are accomplished will appear in the more detailed description which follows.

Before describing the action of the assembled hose end fitting, a detailed description of the various parts of the fitting is here presented.

Figures 1, 2, 3:
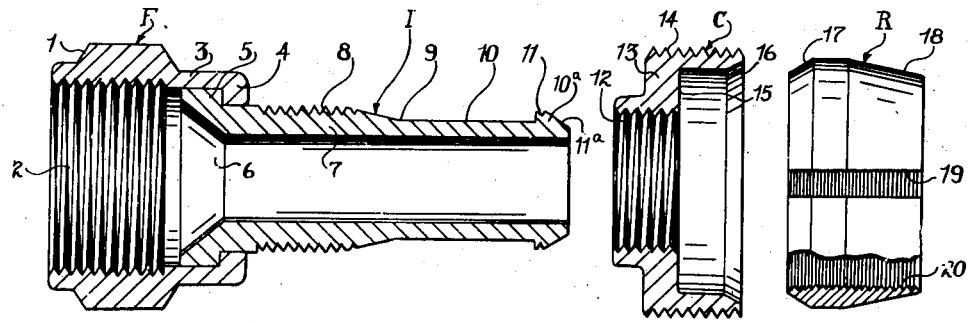
Fig. 1 shows the hose insert and nut of a preferred modification for attaching the fitting to a complementary fitting part.
Fig. 2 shows the intermediate sleeve member.
Fig. 3 shows the split clamping sleeve.

In Fig. 1 the nut F is designed to clamp the hose end to a complementary fitting (not shown). It includes a hexagonal portion 1 to receive a wrench and it may be internally threaded as at 2 and provided with a sleeve portion 3 terminating in a shoulder 4 for forcing portion 5 of the hose insert I against the fitting. In one common type of fitting the nipple which is threaded to nut F has a conical male portion, and in this case an internal conical portion 6 will be provided on the hose insert I. The insert I has a body portion 7 provided with external threads 8 and it has a tapered portion 9 terminating in a reduced sealing portion 10. An enlarged end portion 10a of the insert may have half threads 11 to aid in the hose gripping action and to permit assembly of the fitting. The enlarged portion 10a terminates in a tapered portion 11a to facilitate entry of the insert into the hose.

As seen in Fig. 2, the intermediate or body member C is internally threaded at 12, has a generally radially extended wall 13 and external threads 14. An internal hose abutment surface 15 is provided and a conical or tapered portion 16 is also provided for reasons which will be explained later.

The hose clamping ring or sleeve R is formed with a pair of tapered surfaces 17 and 18, the vertex angle of the taper or cone of surface 18 being smaller than that of surface 17. The sleeve may be split as at 19 to facilitate its contracting about the hose and, as seen in the partially sectioned portion at the lower part of Fig. 3, internal ridges or threads 20 may be provided. This sleeve may be manufactured by extruding material and rolling it up to form an annular sleeve in which case ridges 20 do not take the form of threads but would be circumferential.

Figures 4, 5:
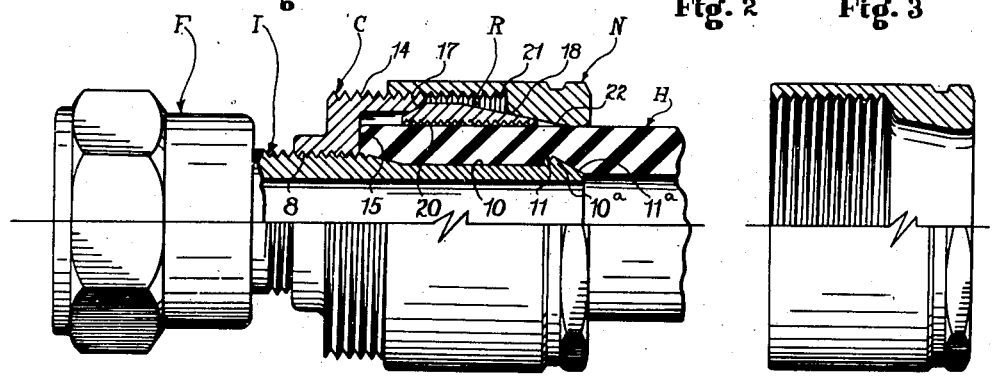
Fig. 4 shows the clamping nut.
Fig. 5 shows the preferred form assembled with a hose in place just before the clamping action is about to start.

Fig. 4 shows the clamping nut N which may include internal threads 21, an internally tapered surface 22 and a polygonal portion 23 to receive a wrench.

Fig. 5 shows an initial stage in the assembly operation. To assemble the fitting with a hose, it is first necessary to clamp the nut F and the insert I together. This may be readily accomplished by threading the mating fitting (not shown) into the nut F and tightening the nut and the mating fitting together, whereby hose insert I is locked to the nut F. This is a common mechanical expedient employed in this art and to avoid confusion as to the nature of the invention, it is not illustrated in the drawings. After that initial operation has been performed, the hose insert I on which is threaded the body member C, is forced into the hose by hand as far as it will go. Before this operation takes place, the intermediate body member C will have been threaded on threads 8 on the insert as far to the left as it will go in order that the advance of the hose will be unimpeded by the abutment wall 15 of body member C. The half threads 11 on the hose insert may be used to facilitate this initial assembly by rotating the hose insert in a direction whereby the threads tend to pull the insert into the hose. After the insert has been run in as far by hand as is feasible, the intermediate body member C is turned so that threads 8 on the insert move body member C towards the end of the hose and this operation is continued until the wall 15 of member C abuts the end of the hose.

The sealing portion 10 is preferably as long as or longer than the ring R to facilitate clamping of the hose against the sealing portion 10 of the insert.

Next, the hose clamping sleeve or ring R, which had been previously slipped over the hose is now brought into position so that its tapered surface 17 engages the complementary surface 16 of the intermediate body member C.

No attempt at this stage is made to force the split hose clamping sleeve member R any further than it will go by hand. Finally, the nut N, which was also slipped over the hose before assembly, or which could be slipped on from a free end of the hose, is brought up and threaded on body member C until its taper 22 engages taper 18 on sleeve R. The fitting is now ready to be firmly tightened by means of a pair of wrenches one of which is applied to the nut N and another to the locked nut F. Upon relative rotation of these wrenches in a direction calculated to tighten the nut N, the novel dual clamping action, which is a feature of this invention, takes place. In describing that action, it will be necessary to break down into discrete steps operations which normally might occur simultaneously, or, if they do occur separately, might occur in reverse order from that which is described. However, for purposes of explanation, one order will be described and it will be apparent that the exact sequence or occurrence of the operations is immaterial, the final result being the same in any case.

Figure 6:
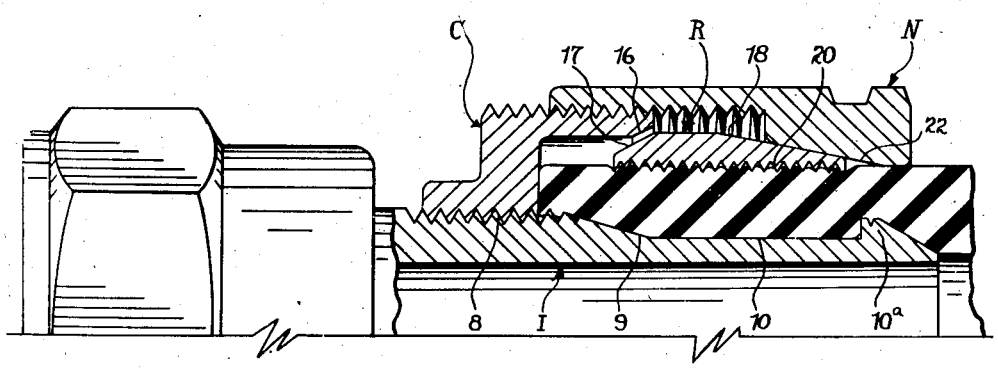
Fig. 6 illustrates one stage in the clamping action.

As seen in Fig. 6, as the nut N is tightened along intermediate body member C, it moves forward and the tapered surface 22 of the nut wedgingly engages the tapered surface 18 of hose clamping sleeve R. This causes radial contraction of the ring R and compression of the ring about the hose, and, since the taper at 18 is relatively shallow as compared to the taper at 17, the radial contraction will be caused largely by the taper at 18. For this reason, as seen in Fig. 6, the taper at 17 will tend to separate from the corresponding taper 16 on the intermediate body member C. When such separation occurs, further tightening of the nut N relative to the intermediate body member C tends to force the ring R and the hose axially towards the wall 15 of member C. As seen in Fig. 7, when the taper 17 again engages taper 16 on the member C, the portion of the hose indicated at 23 is firmly pressed against the wall 15 and the hose is gathered into the space provided there. This is the first of the two novel clamping acts obtained by my invention.

Figure 7:
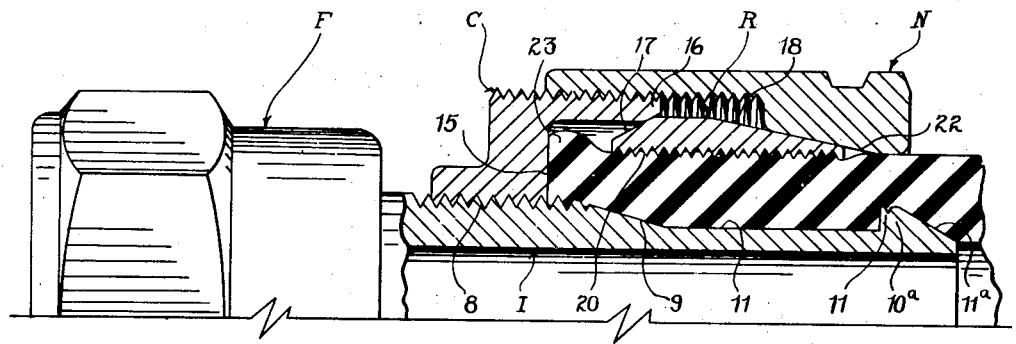
Fig. 7 illustrates another stage in the clamping action.
Figure 8:
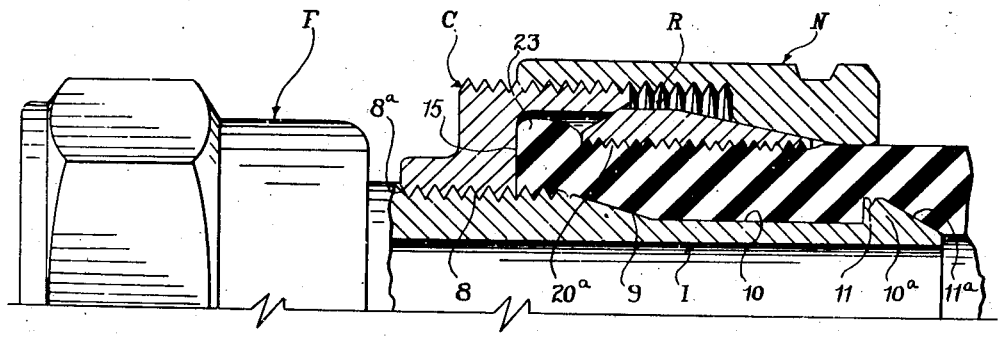
Fig. 8 illustrates the fitting completely set up.

As the hose clamping action exerted by the sleeve R continues, a point is reached eventually at which the resistance to further compression by the sleeve R is greater than resistance to further advancement of the hose insert I into the hose. At this point a new action takes place in that now instead of the nut N turning relative to intermediate body member C, the hose insert I turns relative to member C thereby advancing into the hose with the tapered portion 9 on the insert causing outward expansion of the hose against the ring R. Of course, these two actions, the radial inward compression and the radial outward expansion, may occur either simultaneously or alternately as has been stated. For example, it will be noted that the hose insert in Figs. 6 and 7 is shown advanced farther into the intermediate body member C than when the fitting was initially set up by hand in Fig. 5. As the fitting is tightened the alternate compression of the hose by the sleeve R from the outside and the gathering up of the hose towards the wall 15, and the expansion of the hose from the inside by the insert continues until the fitting is tight. As seen in Fig. 8, with standard size hoses I prefer that when the fitting is tight and a good seal obtained, the threads 8 advance into member C as far as possible as shown at 8a. When the fitting is completely tightened, tapered portion 9 of the hose insert is exerting a powerful outward force on the hose and the clamping sleeve R is exerting a powerful compressive action on the hose forcing it against the sealing portion 10 of the insert as well as forcing the hose end against the wall 15 to further augment the seal.

My novel fitting will function perfectly over a range of variation in hose size due to normal manufacturing tolerances. If the internal diameter of the hose is slightly smaller than normal, this will merely mean that the hose insert I may not be completely threaded into the intermediate body member C. If the outside diameter of the hose is slightly larger than standard, it merely means that the nut N does not advance as far over the hose clamping sleeve R as it does in the situation shown in Fig. 8.

Figure 9:
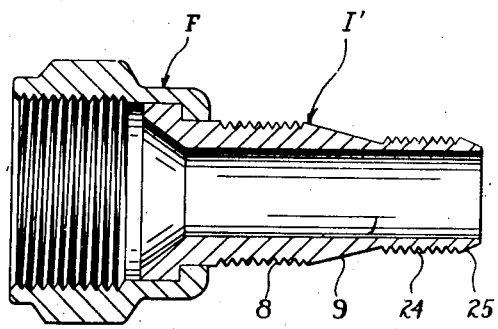
Fig. 9 shows a modified form of hose insert which may replace that shown in previous figures.

Fig. 9 shows a modified hose insert I' in which the smooth sealing surface 10 formerly provided is replaced by a threaded portion 24. A tapered portion 25 is provided on this modified hose insert in such a manner as to provide a hose gripping shoulder between the tapered portion and the sealing portion 24. Such an arrangement might be used with certain types of hose where entry of the insert is difficult, the threads 24 then acting to facilitate such entry.

Figure 10:
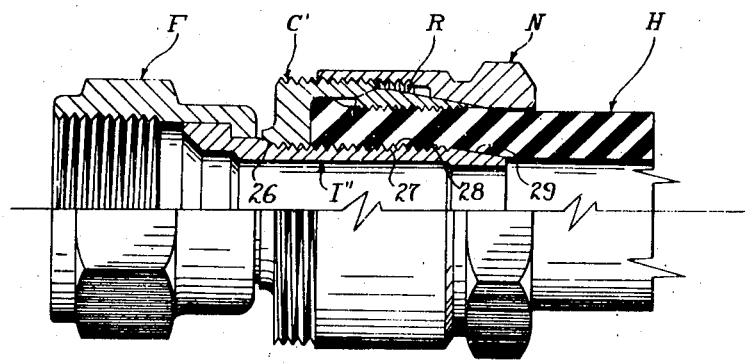
Fig. 10 shows a modified form of hose insert assembled with a hose, the action of which is slightly different from that shown in previous figures.

Another type of hose insert and fitting is shown in Fig. 10. Here the hose insert I'' does not have a tapered portion 9 but instead has a body portion 27 threaded throughout its length as at 28 except for the tapered terminal portion 29. This fitting is assembled and acts in a manner similar to that previously described except that since there is only one tapered portion at 29 on the hose insert I'', the internal expansion of the hose is not as great as it is with the other modifications. Likewise, in this form due to the threaded construction of the hose insert, it is probable that the insert will always thread into the intermediate body member C' until the abutment 26 engages that member.

It can be seen how the novel dual clamping action exerted by my fitting makes it possible to obtain a perfect seal without requiring a long and heavy fitting. In actual tests of my fitting under high-pressure impulse loads, I have found that although my fitting is as much as 50 per cent shorter and lighter than those in the prior art, I am able to provide a seal which will hold up to the bursting point of the hose itself. This reduction in weight and bulk is highly desirable and is particularly important in aircraft work. It will also be apparent to one who examines the construction of my fitting that all machining operations required to manufacture it are of the simplest nature, adapted to screw machine setups. Also, the split ring R can be extruded and then rolled into its final annular shape. Nothing but the simplest turning operations are required to produce the other parts. My fitting produces its powerful seal without the need for large deep-fitting projections which will penetrate and weaken the hose. Also, the gathering up and trapping of the hose portion 23 against the intermediate member C effectively prevents cold flow when my fitting is used on hose material subject to that phenomenon.

It will be understood that the sequence in which the clamping actions described herein actually take place is not subject to rigid analysis, but a sequence has been presented in order to explain how the dual clamping action may take place. It is immaterial whether the hose insert starts moving in first or whether the ring starts clamping first or whether they act together. The final result is that shown in connection with Fig. 8 unless unusual variations in hose size are encountered.

The proportions shown in these drawings are those which under actual tests have been found to be effective but they may be varied without departing from the scope of my invention. With respect to the tapers 17 and 18 on the hose clamping sleeve, the only critical factor is that in making the taper 18 shallower than the taper 17 so that the compressing and hose gathering action described herein will take place. The taper 9 on the hose insert shown in the preferred modification may be varied from that illustrated; however, if it is made too shallow, the amount of internal expansion will be reduced, whereas, if it is made too steep, the hose insert will not properly advance into the hose. It is not necessary that taper 16 shown formed on member C exactly match taper 17, a rounded edge to engage taper 17 will perform substantially the same function. The split ring R can be provided with a straight slot 19 as shown in Fig. 3 or with a staggered slot arrangement such as that commonly found in the prior art where split rings are used. These and other modifications may be made without departing from the spirit and scope of my invention as defined in the appended claims.

Having thus described the present invention so that others skilled in the art may be able to understand and practice the same, I state that what I desire to secure by Letters Patent is defined in what is claimed.

I claim:

1. A hose end comprising a body member having a threaded bore and a cup-shaped recess adapted to receive the end of a hose in close engagement with the bottom of the cup, a hose insert member having a portion threaded in the bore of said body member said insert portion having a tapered surface, a hose clamping sleeve engaging said body at an area axially spaced from the bottom of said recess, and clamping means threaded to said body member and wedgedly engaging said sleeve to compress it about the hose, advancement of said clamping means relative to said insert member causing said sleeve to compress the hose and said insert member to advance into said body so that its tapered portion internally expands the hose, whereby the hose is distorted into the space between the bottom of the cup and the end of the sleeve.

2. A hose end comprising a body member having a threaded bore and a cup-shaped recess adapted to receive the end of a hose in close engagement with the bottom of the cup, a hose insert member having a portion threaded in the bore of said body member said insert portion having a tapered surface, a hose clamping sleeve engaging said body at an area axially spaced from the bottom of said recess, said sleeve having a tapered portion engaging said body and a shallower tapered portion for engagement by clamping means, and clamping means threaded to said body member and wedgedly engaging said sleeve to compress it about the hose, advancement of said clamping means relative to said insert member causing said sleeve to compress the hose and said insert member to advance into said body so that its tapered portion internally expands the hose, whereby the hose is distorted into the space between the bottom of the cup and the end of the sleeve.

FRANK J. RAYBOULD.

REFERENCES CITED

The following references are of record in the file of this patent:

UNITED STATES PATENTS

| Number | Name | Date |
|---|---|---|
| 1,518,778 | Eastman | Dec. 9, 1924 |
| 1,743,922 | Kirlin | Jan. 14, 1930 |
| 1,796,806 | Pearson | Mar. 17, 1931 |
| 2,188,006 | Katcher | Jan. 23, 1940 |
| 2,211,856 | Kreidel | Aug. 20, 1940 |
| 2,333,350 | Weatherhead | Nov. 2, 1943 |
| 2,365,747 | Cowles | Dec. 26, 1944 |

FOREIGN PATENTS

| Number | Country | Date |
|---|---|---|
| 306,761 | Great Britain | Feb. 28, 1929 |
| 850,967 | France | Dec. 30, 1939 |